(12) United States Patent
Marcantonio

(10) Patent No.: US 11,346,478 B2
(45) Date of Patent: May 31, 2022

(54) CONNECTOR FOR CIRCUIT ELEMENTS

(71) Applicant: CEME S.P.A., Trivolzio (IT)

(72) Inventor: Vincenzo Marcantonio, Carbonate (IT)

(73) Assignee: CEME S.P.A., Trivolzio (IT)

( * ) Notice: Subject to any disclaimer, the term of this patent is extended or adjusted under 35 U.S.C. 154(b) by 44 days.

(21) Appl. No.: 16/955,582

(22) PCT Filed: Dec. 21, 2017

(86) PCT No.: PCT/IT2017/000291
§ 371 (c)(1),
(2) Date: Jun. 18, 2020

(87) PCT Pub. No.: WO2019/123494
PCT Pub. Date: Jun. 27, 2019

(65) Prior Publication Data
US 2020/0340607 A1 Oct. 29, 2020

(51) Int. Cl.
*F16L 37/107* (2006.01)
*F16L 37/084* (2006.01)
(Continued)

(52) U.S. Cl.
CPC ......... *F16L 37/0847* (2013.01); *F16L 37/107* (2013.01); *F16L 37/133* (2013.01); *F16L 37/248* (2013.01); *F16L 37/252* (2013.01)

(58) Field of Classification Search
CPC ....... F16L 37/252; F16L 37/248; F16L 37/24; F16L 37/133; F16L 37/12; F16L 37/113; F16L 37/107; F16L 37/0847
See application file for complete search history.

(56) References Cited

U.S. PATENT DOCUMENTS

| | | | |
|---|---|---|---|
| 149,728 A | * | 4/1874 | Diehl et al. ........... F16L 37/252 285/88 |
| 1,118,129 A | * | 11/1914 | Herr ....................... F16L 37/252 285/88 |

(Continued)

FOREIGN PATENT DOCUMENTS

| | | |
|---|---|---|
| CN | 203099174 | 7/2013 |
| CN | 105443905 | 3/2016 |
| FR | 2935167 | 2/2010 |

OTHER PUBLICATIONS

Machine Translated English Description of CN203099174—retrieved on Nov. 2, 2021—from EPO.*

*Primary Examiner* — Matthew Troutman
*Assistant Examiner* — James A Linford
(74) *Attorney, Agent, or Firm* — Pearne & Gordon LLP

(57) ABSTRACT

A connector for circuit elements of hydraulic or pneumatic systems, comprising: a first connecting body (10) extending along an axis (X); a second connecting body (20) extending along an axis (Y); wherein the first connecting body (10) and the second connecting body (20) can be installed on respective portions of circuit elements and are configured to provide a reversible fluid connection between the circuit elements in which the connector comprises: a first coupling member comprising a male tubular portion on the first connecting body (10) and a respective female tubular portion (23) on the second connecting body (20) to realize a fluid sealing connection by inserting the male tubular portion into a cavity of the female tubular portion (23) configured to guide the male tubular portion; a second coupling member comprising at least one protuberance (14) on an outer surface (11) of the first connecting body (10) and a respective groove (24) on the second connecting body (20) for making a mechanical reversible connection between the first connecting body (10) and the second connecting body (Continued)

(20) in which the protuberance (14) is configured to fit into the groove (24) and prevent an axial extraction between the first connecting body (10) and the second connecting body (20); a third coupling member comprising on the first connecting body (10) at least one flexible tab (15) having a projection (16) on the outer surface (11) and an opening on an external surface (21) of the second connecting body (20) suitable to contain the projection (16) to prevent a relative rotation between the first connecting body (10) and the second connecting body (20) around the respective development axes (X, Y).

13 Claims, 1 Drawing Sheet

(51) Int. Cl.
*F16L 37/133* (2006.01)
*F16L 37/248* (2006.01)
*F16L 37/252* (2006.01)

(56) References Cited

U.S. PATENT DOCUMENTS

| | | | | |
|---|---|---|---|---|
| 3,645,562 | A | * | 2/1972 | Fandetti ............... F16L 37/252 285/73 |
| 4,611,662 | A | * | 9/1986 | Harrington ........... E21B 17/046 166/242.6 |
| 2011/0148107 | A1 | | 6/2011 | Blivet |
| 2018/0066780 | A1 | | 3/2018 | Blivet |

* cited by examiner

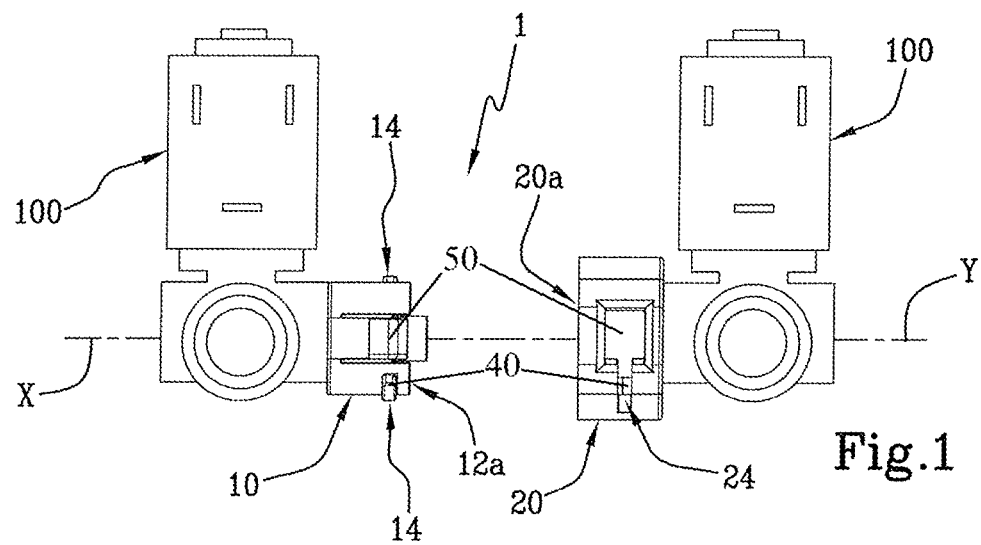
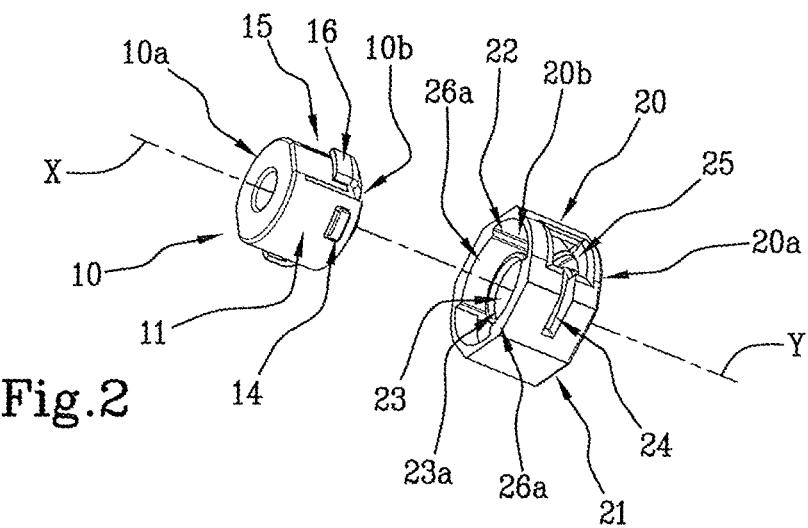
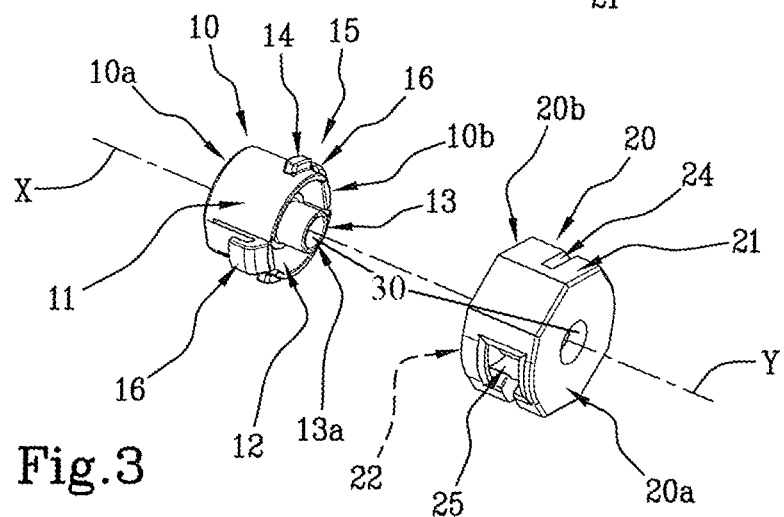

CONNECTOR FOR CIRCUIT ELEMENTS

The present invention relates to a connector for circuit elements of hydraulic or pneumatic systems.

In particular, the present invention relates to a connector for circuit elements configured to reversibly provide a reversible fluid connection between two circuit elements, in fact. The term circuit elements means, for example: valve bodies, ends of pipes, distributors or flow deviator of various nature and similar elements.

Generally, the connectors for circuit elements comprise threaded sleeves to be clamped on a respective portion of an equally threaded pipe or fitting.

The connectors of the known type require different time for their complete screwing/unscrewing and a good deal of attention by the installer for the correct positioning between the threaded portion of the pipe and that of the ring in order to avoid damage to the thread and/or to the fluid sealing system. A damage to the thread or the sealing system would irreversibly compromise the connection between the two circuit elements.

In this context, the technical aim of the present invention is to provide a connector for circuit elements without the aforementioned drawbacks.

It is also an object of the present invention to provide a connector for circuit elements which possesses greater reliability and durability over time.

A further object of the present invention is to provide a connector for circuit elements which can be easily assembled/disassembled, which preferably does not provide for the use of specific tools but only a manual gesture of the installer.

These and other objects are substantially achieved by a connector for circuit elements as described in one or more of the appended claims. The dependent claims correspond to possible further embodiments of the connector for circuit elements.

Further characteristics and advantages will become more clear from the detailed description of a preferred but non-limiting embodiment of a connector for circuit elements according to the present invention.

This description is provided with reference to the appended figures, also provided only by way of a non-limiting example, wherein:

FIG. 1 is a perspective view of a connector for circuit elements according to the present invention;

FIG. 2 is a detailed perspective view of the connector of FIG. 1;

FIG. 3 is an additional detailed perspective view of the connector of FIG. 1.

In the appended figures from 1 to 3 a connector for circuit elements in accordance with the present invention has been illustrated as a whole wherein such system is indicated as a whole with the reference number 1.

The connector 1 for circuit elements 100 comprises a first connecting body 2 extending along a respective axis "X" as illustrated in the appended figures.

The connector 1 further comprises a second connecting body extending along a respective axis "Y".

The first connecting body 10 and the second connecting body 20 can be installed on respective portions of circuit elements 100 of a fluid system.

In greater detail, for circuit elements 100 it is meant, for example: valve bodies, pipe ends, flow distributors or deviators of various nature and similar elements. In particular, the connector 1 is configured for use on pipes and/or circuit elements of hydraulic or pneumatic systems without any limitation.

As shown schematically by way of example in the appended figures, the connector 1 is configured to have a fluid connection between at least two valves of a hydraulic system, therefore the circuit elements 100 shown schematically in the appended figures are two valves.

The first connecting body 10 and the second connecting body 20 are configured to provide a reversible fluid connection between the circuit elements 100. In other words, the first connecting body 10 and the second connecting body 20 can be connected to each other and can be disconnected from each other in accordance with the maintenance and/or intervention requirements on the circuit elements 100.

Preferably, the first connecting body 10 is at least partially insertable into the second connecting body 20 to provide a complete axial coupling of the first connecting body 10 with the second connecting body 20. By axial coupling it is meant along the respective development axis "X" and "Y" of the first connecting body 10 and of the second connecting body 20. In fact, in a complete fluid connection configuration between the circuit elements 100, the first connecting body 10 is at least partially inserted inside the second connecting body 20 and the respective development axis "X" and "Y" coincide.

Preferably, the first connecting body 10 has a symmetrical cup shape with respect to the axis "X" defined by an outer surface 11 and an inner surface 12.

Preferably, the first connecting body 10 has a first end 10a which can be connected to a circuit element 100 and a second end 10b which can be connected to the second connecting body 20.

Preferably, the second connecting body 20 has a symmetrical cup shape with respect to the development axis "Y" defined by a respective outer surface 21 and an inner surface 22.

Preferably, the second connecting body 20 has a first end 20a which can be connected to a circuit element 100 and a second end 20b which can be connected to the first connecting body 10.

The first connecting body 10 has a smaller external size so that it can be inserted at least partly into the second connecting body 20. In particular, the outer surface 11 of the first body 10 has a diameter measurement at least equal to a measure of the diameter of the internal surface 22 of the second connecting body 20.

In accordance with the present invention, the connector 1 comprises a first coupling member 30 comprising a male tubular portion 13 on a first connecting body 10 and a respective female tubular portion 23 on said second connecting body 20.

In particular, the female tubular portion 23 has a cavity configured to guide the male tubular portion 13.

Preferably, the first coupling member 30 is configured to provide a fluid sealing connection by inserting the male tubular portion 13 into the cavity of the female tubular portion 23.

With reference to the above description, the inner surface 12 of the first connecting body 10 is facing, at least partially, the male tubular portion 13.

Preferably, the male tubular portion 13 is coaxial and asymmetric with respect to the axis "X".

The inner surface 22 of the second body 20 is facing, at least in part, the female tubular portion 23.

Preferably, the female tubular portion 23 is coaxial and asymmetric with respect to the axis "Y".

The male tubular portion 13 has an inner passage duct 13a preferably arranged coaxially with the axis "X" of the first connecting body 10. The female tubular portion 23 has a respective internal passage duct 23a preferably arranged coaxially with the axis "Y" of the second connecting body 20.

The first coupling member 30 comprises fluid sealing means disposed on the male tubular portion 13 and/or on the female tubular portion 23, preferably the sealing means comprising at least one O-ring, not shown in the appended figures.

According to the present invention, the connector 1 comprises a second coupling member 40 comprising at least one protuberance 14 on the outer surface 11 of the first connecting body 10 and a respective groove 24 on the second connecting body 20. By way of non-limiting example, the aforesaid groove 24 may be a shortage of material, therefore more similar to a notch in the material of the second connecting body 20, as schematically illustrated in the appended figures.

The second coupling member 40 is configured to provide a reversible mechanical connection between the first connecting body 10 and the second connecting body 20 in which the protuberance 14 is configured to fit into the groove 24 and prevent an axial extraction between the first connecting body 10 and the second connecting body 20.

According to the embodiment of the invention, the second coupling member 40 comprises two protuberances 14 on the first connecting body 10 and two respective grooves 24 on the second connecting body 20. In particular, in the preferred embodiment of the invention, the grooves 24 are such as to put in communication the outer surface 11 with the inner surface 12 of the second connecting body 10.

Preferably, the first connecting body 10 has two protuberances 14 arranged diametrically opposed to the development axis "X" and arranged on the outer surface 11 and the second connecting body 20 has respective grooves 24 for the insertion of the protuberances 14 arranged diametrically opposed to the axis "Y" along the outer surface 21.

Preferably, the coupling of the protuberances 14 in the respective grooves 24 is of the reversible snap type, in fact a relative flexibility of the material of the first body 10 and/or of the second body 20 is also used in the insertion/disconnection.

With reference to the material used to make the connector 1, it may comprise plastic, or plastic loaded with glass fibres, or special polymers resistant to high pressures, to corrosive substances or high temperature, or else the connector 1 may comprise at least the first connecting body 10 and the second connecting body 20 made of metal.

According to the present invention, the connector 1 comprises a third coupling member 50 comprising on the first connecting body 10 at least one flexible tab 15 having a projection 16 on the outer surface and an opening 25 on the outer surface 21 of the second connecting body 20. Preferably, the opening 25 is configured to contain the projection 16 of the tab 15 and to prevent a rotation between the first connecting body 10 and the second connecting body 20 around the respective axis "X" and "Y". In other words, the third coupling member 50 allows to realize a reversible torsional bond between the first connecting body 10 and the second connecting body 20.

In greater detail, after coupling between the first connecting body 10 and the second connecting body 20, the projection 16 of the tab 15 is flush or slightly protruding with respect to the outer surface 21 of the second body 20 and is completely housed in the opening 25. The arrangement (and therefore the coupling between the first body 10 and the second body 20) of the projection 16 in the opening 25 spontaneously takes advantage of the flexibility of the tab 15 once the projection 16 is at the opening 25. A decoupling between the first connecting body 10 and the second connecting body 20 takes place by means of a pressure on the projection 16 of the tab 15 which causes it to exit from the opening 25 allowing a torsional rotation of disconnection between the first body 10 and the second body 20 of the connector 1. Preferably, the projection 16 has a corrugated and/or knurled surface portion to increase the grip thereof by an installer during a decoupling/coupling between the first connecting body 10 and the second connecting body 20.

According to the invention, the first connecting body 10 comprises two flexible tabs 15, diametrically opposite to the axis "X", similarly the second connecting body 20 has two openings 25, diametrically opposed to the axis "Y", on the outer surface 21 to contain the respective tabs 15.

It is noted that the openings 25 of the second connecting body 20 pass through the wall of the second body 20 itself, in other words the openings 25 are such as to put in communication the outer surface 21 with the internal surface 22 of the second connecting body 20.

With reference to the aforementioned tab(s) 15, they are formed by incisions in the wall of the first connecting body 10 in such a way that each tab 15 is fixed at the first end 10a of the first body 10 and free to flex at the second end 10b of the first body 10, opposite to the first end 10a.

Preferably, with reference to the second body 20 the grooves 24 and the openings 25 are connected to each other, the grooves, in particular, extend along a circumferential portion of the second connecting body 20 and have a width equal to a depth of each protuberance 14 of the first connecting body 10, depth measurable preferably in the direction of the development axis "X" and/or the axis "Y".

In greater detail, in an end portion of each groove 24 there is a respective opening 25, preferably each opening 25 has a width equal to that of the projection 16 of the first connecting body 10, a width measurable preferably in the direction of the development axis "X" and/or of the axis "Y".

This embodiment, i.e. with the grooves 24 and the openings 25 connected to each other, is illustrated by way of non-limiting example in the appended figures.

Preferably, the second connecting body 20 has on the inner surface 22 at least one seat 26a configured for the axial sliding of a respective protuberance 14, as shown in the appended figures. The sliding seat 26a of the protuberance 14 has an outlet at the second end 20a of the second connecting body 20.

Preferably, the second connecting body 20 has on the inner surface 22 at least one further seat 26b configured for the axial sliding of the projection 16 of a respective tab 15 allowing the axial insertion of the first connecting body 10 inside the second connecting body 20 and making the connection of a circuit element 100 with another circuit element 100, for example two ends of a hydraulic or pneumatic pipe. Such embodiment is not illustrated in the appended figures.

In particular, a possible sequence of steps for realizing the coupling of the first connecting body 10 with the second connecting body 20 and therefore the fluid connection between two circuit elements 100, provides for the step of bringing the two bodies 10, 20 close to each other, i.e. the second end 10b of the first body to the second end 20a of the second body 20. Subsequently, it provides for the step of positioning the protuberances 14 at the respective seats 26a.

Subsequently, it provides for the step of axially engaging the first body 10 by translating it along the axis "X" (and the axis "Y") inside the second connecting body 20 until the protrusions 14 have reached the grooves 24 up to partially escape from them.

In this phase the axes "X" and "Y" are already coincident/coaxial with each other, the internal passage 13a of the male tubular portion 13, in fact, is already partially inserted or at least abutted to the internal passage 23a of the female tubular portion 23.

Subsequently, it provides for the clockwise (or anticlockwise) rotation phase of the first connecting body 10 around the axis "X" (and the axis "Y") so as to make the projections 16 of the tabs 15 emerge from the respective openings 25. A click of the projections 16 in the respective openings 25 confirms that the reversible fluid connection between a first circuit element 100 provided with the first connecting body 10 and a second circuit element 100 provided with the second connecting body 20 has definitely occurred.

A possible sequence of steps for carrying out the decoupling of the first connecting body 10 from the second connecting body 20 and therefore the disconnection between the two circuit elements 100, provides an inverse sequence of the above described steps in an exemplary manner.

The present invention has achieved the intended purposes.

In fact, thanks to the structural architecture of the connecting bodies of the present invention, it is possible to provide a reversible fluid connection in a safe manner, avoiding the occurrence of losses due to wear or incorrect coupling of the two connecting bodies. The present invention prevents an accidental extraction of the two connecting bodies, it also prevents a relative rotation between the two bodies which could cause excessive wear on the sealing means as well as a misalignment of the internal fluid passages (liquid or gas) as it happens for the fluid coupling systems of the known type, as mentioned above.

The present invention provides a connector which is simple to use, intuitive, safe and rapid, which does not require specific technical skills by an installer.

The present invention provides a connector totally free of threaded parts and therefore does not require the use of special tools for its installation.

The invention claimed is:

1. Connector (1) for circuit elements (100) of hydraulic or pneumatic systems, comprising:
    a first connecting body (10) extending along an axis (X), the first connecting body (10) having a cup shape defined at least in part by an outer peripheral wall extending axially and having an outer surface (11) and an inner surface (12), the first connecting body (10) comprising a tube (13) extending axially inside the outer peripheral wall, the tube (13) having an inner surface and having an outer surface facing the inner surface (12) of the outer peripheral wall;
    a second connecting body (20) extending along an axis (Y);
    wherein said first connecting body (10) and said second connecting body (20) can be installed on respective portions of said circuit elements (100) and are configured to provide a reversible fluid connection between said circuit elements (100); wherein said connector (1) comprises:
    a first coupling member (30) comprising a male tubular portion (13) on said first connecting body (10) and a respective female tubular portion (23) on said second connecting body (20) to realize a sealed fluid connection by inserting said male tubular portion (13) into a cavity of said female tubular portion (23) configured to guide said male tubular portion (13), the male tubular portion (13) comprising the tube (13);
    a second coupling member (40) comprising at least one protuberance (14) on the outer surface (11) of said first connecting body (10) and a respective groove (24) on said second connecting body (20) to realize a reversible mechanical connection between said first connecting body (10) and said second connecting body (20) wherein said protuberance (14) is configured to fit into said groove (24) and prevent an axial extraction between the first connecting body (10) and the second connecting body (20);
    a third coupling member (50) comprising on said first connecting body (10) at least one flexible tab (15) having a projection (16) on the outer surface (11) and an opening (25) on an external surface (21) of said second connecting body (20) adapted to contain said projection (16) to prevent a relative rotation between the first connecting body (10) and the second connecting body (20) around the respective development axes (X, Y), said first connecting body (10) is at least partially insertable in said second connecting body (20) to realize a complete axial coupling of the first connecting body (10) with the second connecting body (20).

2. Connector (1) according to claim 1, wherein the male tubular portion (13) has an internal passage duct (13a) coaxially arranged with respect to the development axis (X) of the first connecting body (10) and said female tubular portion (23) has a respective internal passage duct (23a) disposed coaxially to the development axis (Y) of the second connecting body (20).

3. Connector (1) according to claim 1, wherein said second connecting body (20) has a cup shape symmetrical with respect to the development axis (Y) defined by an outer surface (21) and an inner surface (22) facing said female tubular portion (23), said female tubular portion (23) being coaxial with the axis (Y).

4. Connector (1) according to claim 1, wherein the cup shape of said first connecting body (10) is symmetrical with respect to the axis (X) said male tubular portion (13) being coaxial with the axis (X).

5. Connector (1) according to claim 1, wherein said first connecting body (10) has two flexible tabs (15) and wherein there are corresponding openings (25) on the outer surface (21) of the second connecting body (20) and wherein each of said flexible tabs (15) has (a) a first end which is fixed to the first connecting body (10) and (b) a second end which is free to flex, a first end (10a) of the first connecting body (10) being connectable to a circuit element (100) and a second end (10b) of the first connecting body (10) being reversibly connectable to said second connecting body (20).

6. Connector (1) according to claim 1, wherein said first connecting body (10) has two protuberances (14) arranged diametrically opposite to the development axis (X) and said second connecting body (20) presents respective grooves (24) for the reversible insertion of the protuberances (14).

7. Connector (1) according to claim 6, wherein the coupling of said protuberances (14) in said grooves (24) is of the snap type.

8. Connector (1) according to claim 1, wherein said first coupling member (30) comprises fluid sealing means disposed on the male tubular portion (13) and/or on the female tubular portion (23).

9. Connector (1) according to claim 8, wherein said fluid sealing means comprises at least one O-ring.

10. Connector (1) according to claim 1, wherein said groove (24) and said opening (25) are connected to each other and wherein said groove (24) extends along a circumferential portion of said second connecting body (20) and has a width equal to that of said protuberance (14) of the first connecting body (10) and wherein said opening (25) has a width equal to that of the projection (16) of the first connecting body (10).

11. Connector (1) according to claim 1, wherein said second connecting body (20) has on an the inner surface (22) at least one seat (26*a*) configured for axial sliding of said protuberance (14).

12. Connector (1) according to claim 11, wherein said second connecting body (20) has a first end (20*a*) connectable to a circuit element (100) and a second end (20*b*) opposite to the first end (20*a*) on which said at least one seat (26*a*) configured for axial sliding protrudes.

13. Connector (1) according to claim 9, wherein said second connecting body (20) has on its inner surface (22) at least one seat configured for axial sliding of said projection (16); said second connecting body (20) being configured for allowing the axial insertion of the first connecting body (10) inside the second connecting body (20).

* * * * *